Sept. 14, 1937.   H. KLAYF   2,092,922

LENS ATTACHING POST OR STUD

Filed April 9, 1936

Inventor
Hyman Klayf

Benj. J. Roodhouse
Atty.

Patented Sept. 14, 1937

2,092,922

UNITED STATES PATENT OFFICE 2,092,922

LENS ATTACHING POST OR STUD

Hyman Klayf, Chicago, Ill.

Application April 9, 1936, Serial No. 73,473

4 Claims. (Cl. 88—47)

My present invention relates to improvements in lens attaching posts or studs for use in connection with rimless spectacles and eyeglasses.

There is considerable change of style governing the sizes and shapes of lenses for spectacles and eyeglasses, but, hitherto, the bracket or post or stud which is employed for attaching the inner edge of the lens to the nose piece or bridge has uniformly been located at the end of the horizontal meridian of the lens, so that the extended element which contacts the edge of the lens will be equally angled or curved from its central point and thereby more firmly and securely hold the lens.

A style of mounting has also become known, generally called "clear vision", in which the post or stud for securing the temples to the lenses in spectacle construction have been mounted above the horizontal meridian of the lens. When the post or stud is mounted off of the horizontal meridian the element which contacts the edge of the lens must be set obliquely with respect to the pillar or stud as the periphery or edge of the lens extends in different curves or angles from the end of the pillar or stud.

Heretofore the obliquity of the edge contacting element has been taken care of by casting or otherwise forming pillars or studs having edge contacting extensions or developments at the desired angle for the shape of the lens which was to be used. This was quite expensive as particular pillars or studs must be provided for each size or shape of lens which it was desired to use. Moreover, when the edge contacting element is set or angled obliquely with respect to the post or stud it is necessary to provide rights and lefts.

In attaching posts or studs to lenses it is found that the lenses may frequently be angled with advantage with reference to the plane of the axis of the pillar or stud which immediately angles the edge of the lens with respect to the lens contacting element. Such a condition is unavoidably developed when concavo-convex, or what is known as toric lenses are employed.

It has heretofore been sought to improve the fit of the edge contacting elements, of lens attaching brackets or pillars or studs by providing springs, but while such springs are useful in adapting the edge contacting elements to the peripheries or edges of the lens they are mere palliatives and ultimately develop considerable trouble because they provide play or movement between the lens and the bracket which sooner or later causes these parts to work loose.

It has been my object to provide a bracket or stud for the attachment of lenses in rimless eyeglasses and spectacles providing adjustment of the lens edge contacting element independently of the axis of the post or stud and independently of the adjustment which may be given to the ears carried by the post or stud for contacting the opposite faces, as distinguished from the periphery or edge.

I have accomplished the foregoing object by means of the structure illustrated in the accompanying drawing in which—

Similar reference characters refer to similar parts throughout the respective views.

Figure 1:
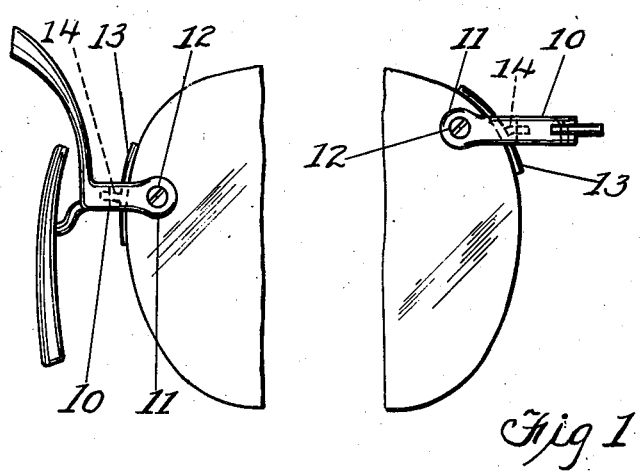
Fig. 1 is a front fragmental elevation of a lens and temple bridge of a pair of rimless spectacles having what are known as leaf shape lenses with which my present invention may be used to advantage.
Figure 2:
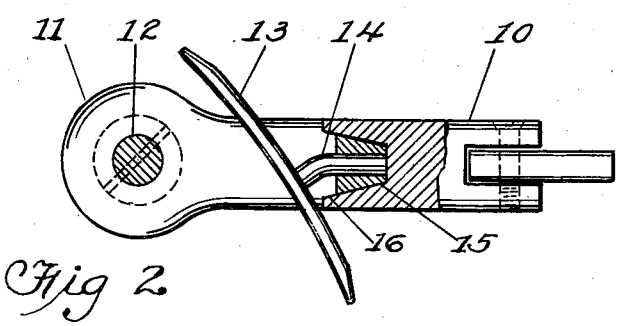
Fig. 2 is a central vertical section through the post or stud of a lens attaching bracket in which my invention is embodied.
Figure 3:
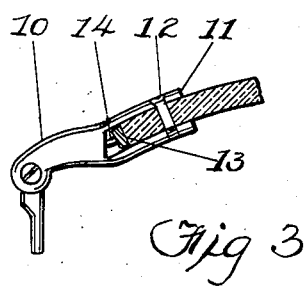
Fig. 3 is a fragmental detail showing how the lens edge contacting element may be angled transversely to maintain registry with the edge of a "toric" form of lens.
Figure 4:
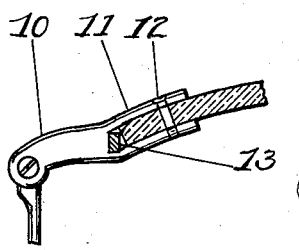
Fig. 4 is a sketch similar to Fig. 3 showing how transverse registry is not maintained without adjusting means as provided herein.

A lens attaching bracket comprises a pillar or stud 10, one end of which carries, in any desired manner, either the bridge and finger piece or the temple.

Projecting from the opposite end of the pillar or stud 10 are parallel developments or plates or ears 11, adapted to contact the opposite faces of a lens, which ears or plates 11 further carry a screw 12 passing through a suitable bore provided in the body of the lens.

Extending from the end of the pillar or stud 10 at the base of the plates or ears 11, is the strap or lens edge contacting element 13.

I provide such a lens contacting element with an independent stud 14 of its own, extending from substantially the center of the element from the surface thereof opposite to that which contacts the periphery of the lens. Into the inner end of the pillar or stud 10 I provide a recess or bore 15, the outer portion of which is reamed out, or otherwise enlarged, at 16, to permit movement of the portion of the stud 14 adjacent the edge contacting element. The inner end of the stud 14 is fixed by means of solder, or forced fit, or in any other desired manner, in the inner, unenlarged portion of the recess or bore 15.

It will now be perceived that the heretofore described and illustrated structure will permit of the adjustment of the edge contacting element of lens attaching brackets independently of the axis of the bracket and independently of the positions of the elements which contact the faces of the lens so that the edge contacting strap will conform with the edge of the lens vertically and horizontally.

As heretofore pointed out this structure will do away with the necessity of and reason for employing a spring with such edge contacting element, but it will also permit of the employment of such a spring if it be deemed to be desirable in any particular case.

As will be seen, my structure will permit the lens attaching bracket to be secured at any point of the periphery of an irregularly shaped lens. It will further overcome the necessity of providing lefts and rights and the glasses may be angled with respect to the axis of the bracket without destroying what may be regarded as the transverse contact between the edge or periphery of the lens and the lens edge contacting element.

Another advantage of my construction is that in repair jobs the length of the independent stud may be readily varied so as to secure a better fit of the bracket with the lens, no matter how near the edge thereof the lens may have been bored for the passage of the attaching screw.

Having described my invention what I claim is new and desire to secure by Letters Patent is:

1. A lens attaching bracket for lenses for rimless spectacles and eyeglasses comprising a pillar or stud, developments extending from one end of said pillar or stud adapted to contact opposite faces of a lens, said pillar or stud being provided with a bore or recess located between said developments, and an element adapted to contact the edge or periphery of a lens provided with an independent non-rotatable, bendable stud of its own, a portion of which independent stud is fixedly secured within said bore or recess of the pillar of the bracket so as to hold said lens edge contacting element adjustably spaced from the end of said pillar or stud.

2. A lens attaching bracket for lenses for rimless spectacles and eyeglasses comprising a pillar or stud, developments extending from one end of said pillar or stud adapted to contact opposite faces of a lens, said pillar or stud being provided with a bore or recess flared at its opening, located between said developments and an element adapted to contact the edge or periphery of a lens provided with an independent non-rotatable, bendable stud of its own, a portion of which independent stud is fixedly secured within the unflared portion of said bore or recess of the pillar of the bracket so as to hold said lens edge contacting element adjustably spaced from the end of said pillar or stud.

3. A lens attaching bracket for rimless spectacles or eye glasses comprising a pillar or stud, developments extending from one end of said pillar or stud adapted to contact opposite faces of a lens, an element adapted to contact the edge or periphery of a lens provided with an independent non-rotatable, bendable stud of its own formed from ductile material and means for fixedly securing a portion of said independent ductile stud fixedly between the lens face contacting developments to the first mentioned pillar or stud of the bracket so as to hold said lens edge contacting element adjustably spaced from the end of said pillar or stud.

4. A lens attaching bracket for lenses for rimless spectacles and eyeglasses comprising a pillar or stud, developments extending from one end of said pillar or stud adapted to contact opposite faces of a lens, an element adapted to contact the edge or periphery of a lens and non-rotatable, bendable means for mounting said element between said face contacting developments to and spaced from the first mentioned pillar of the bracket adapted to rigidly secure said edge contacting element longitudinally and transversely so as to adapt said edge contacting element to the edge of a lens.

HYMAN KLAYF.